June 21, 1932.  L. D. JONES  1,864,511
METHOD AND APPARATUS FOR SEPARATING IMMISCIBLE SUBSTANCES
Original Filed May 1, 1924
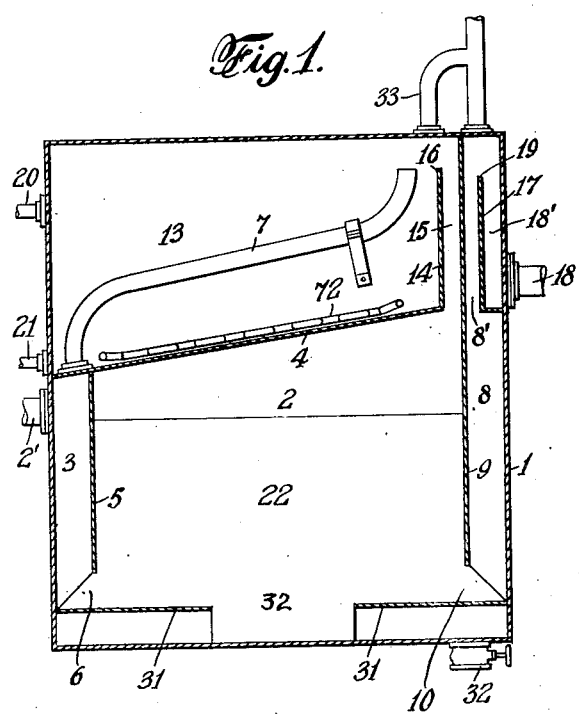
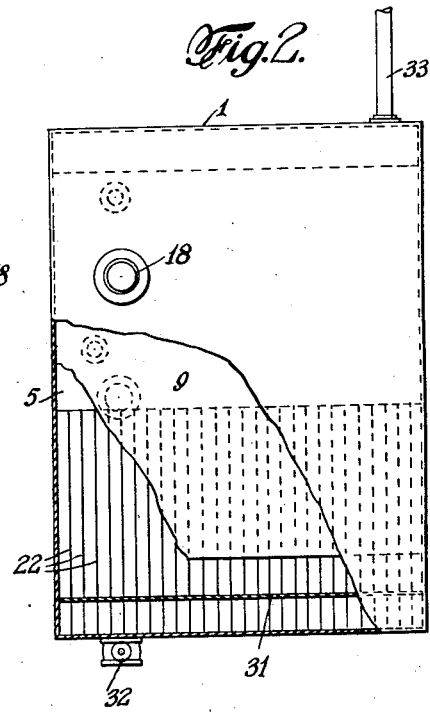
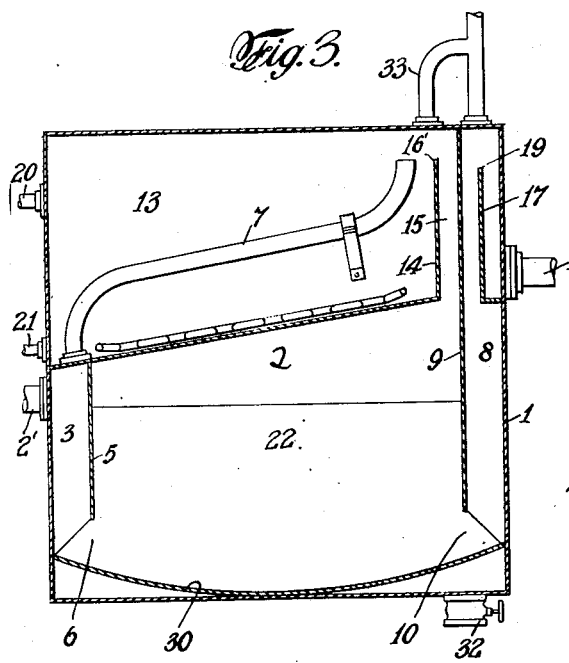
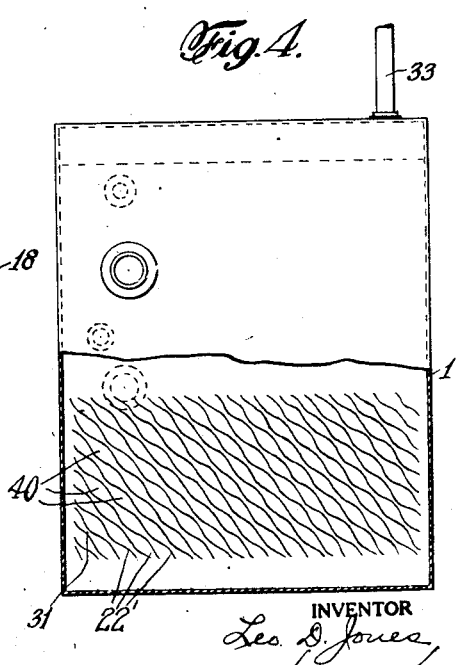
INVENTOR
Leo D. Jones
BY Kenyon & Kenyon
ATTORNEYS Patented June 21, 1932

1,864,511

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

METHOD AND APPARATUS FOR SEPARATING IMMISCIBLE SUBSTANCES

Original application filed May 1, 1924, Serial No. 710,390. Divided and this application filed May 15, 1925, Serial No. 30,449. Renewed October 17, 1931.

My invention relates to methods and apparatus for the separation of immiscible substances and in particular to such methods and apparatus wherein separation is effected by force of gravity.

It is an object of my invention to provide a method and apparatus wherein immiscible substances are separated by the force of gravity, the method and the operation of the apparatus being continuous and the advantages of separation of the mixture in batches being preserved.

A further object of my invention is to provide a method and apparatus for the separation of immiscible substances wherein the discharge or withdrawal of the separated constituents of the mixture may be caused to occur in the proportions in which the constituents exist in the mixture by automatically controlling such discharge or withdrawal although that control may be effected either mechanically or manually.

A further object of my invention is to provide a method and apparatus for the separation of immiscible substances by the force of gravity wherein motion such as that occurring on shipboard will neither interfere with the separating step nor the discharge in proper proportion of the separated constituents.

A further object of my invention is to provide a method and apparatus wherein both lighter and heavier immiscible substances may be separated from another substance with which lighter and heavier substances are mixed.

An important application of my invention resides in the separation of oil and oily substances from mixtures thereof that occur on shipboard in bilge water and in ballast water contained in fuel oil tanks or compartments of the ship. Accordingly it is a further object of my invention to provide a method and apparatus whereby large quantities of a mixture of immiscible substances may be handled rapidly and effectively separated at the same time.

In the method and apparatus embodying my invention one or more bodies of a mixture that is to be separated into its constituents is maintained in a quiescent state and fresh quantities of the mixture are flowed across each of such bodies of mixture at a desired level or stratum thereof. To this end, if it is desired to separate the mixture into only two constituents, fresh mixture may be flowed across the bottom surface of the quiescent body with the result that the lighter constituent rises into the quiescent body and the heavier constituent is withdrawn at substantially the same level at which it was introduced, or fresh mixture may be flowed across the upper surface of the quiescent body with the result that the heavier constituent sinks thereinto and the lighter is withdrawn at substantially the level at which it was introduced. To the same end fresh mixture may be flowed across a stratum of the quiescent body that is intermediate between the top and bottom thereof with the result that lighter constituents rise from that stratum into an upper area of quiescence, heavier constituents may sink from that stratum into a lower area of quiescence, and a constituent of intermediate specific gravity may pass along that stratum and be withdrawn from substantially the same level at which it was introduced. In either case the constituent that passes into a quiescent body or area is removed therefrom at the opposite surface thereof from that at which fresh mixture is introduced and discharged. While the discharge or withdrawal of the separated constituents in the proportions in which they exist in the mixture may be manual or mechanical such discharge and withdrawal may be accomplished automatically in accordance with my invention by maintaining liquid balance between the separated constituents, such liquid balance preferably being effected by the discharge of constituents over separate weirs. Also in accordance with my invention, turbulence of flow that might disturb the desired quiescence of a body of the mixture, particularly when large quantities of the mixture are being rapidly handled, is prevented by insuring stream-line flow of liquid as by dividing the cross-sectional area of the flowing stream of mixture into a plurality of streams of reduced cross-sectional area. And, also in accordance with my invention interference with the proper operation of my method and apparatus by such movement of the parts as might occur on shipboard is prevented as by providing relatively narrow but long passages leading to the discharge-controlling weirs, by placing such weirs in close relation and by making the weirs of unusual length.

Other and further objects, features and advantages of my invention will appear from the following description of an illustrative embodiment of my invention taken in connection with the accompanying drawing in which, Fig. 1 is a vertical sectional view of apparatus embodying and whereby my invention may be practiced, Fig. 2 is a view from the right hand side of Fig. 1 with parts broken away, Fig. 3 is a view similar to Fig. 1 but showing a modification, and Fig. 4 is a view similar to Fig. 2 but showing a modification.

Referring to the illustrative forms of apparatus embodying and whereby my invention may be practiced that are shown in the drawing, the main tank 1 is provided with a main separating compartment 2 wherein a body of mixture may be maintained in quiescence while fresh mixture is flowed therethrough at the desired stratum or level or surface. The compartment 2 is formed between the front and back walls of the tank 1 and between the partitions 5 and 9 that extend across the tank, and are spaced from the bottom thereof to provide passages 6 and 10 respectively below the partitions 5 and 9. The space between the partition 5 and the adjacent end of the tank forms an inlet compartment 3 into which fresh mixture is introduced through the pipe 2. The space between the partition 9 and the adjacent end of the tank forms a discharge compartment 8 from which a constituent is withdrawn through the pipe 18 as hereinafter more fully described. Any of the lighter constituent that rises in the inlet compartment 3 may be withdrawn therefrom through the pipe 7 as hereinafter more fully described. Mixture passes from the inlet compartment 3 through the passage 6 and one constituent (e. g. oil or oily substances) will rise into the quiescent area between the partitions 5 and 9 while another constituent (e. g. water) flows across the separating compartment 2 and flows out through the passage 10 to the outlet compartment. It is sometimes desirable to provide a curved bottom plate or guide 30 so that mixture flowing out of the inlet compartment 3 will not be deflected up into the quiescent body of the mixture but will follow the curve closely without disturbing the quiescent body, the heavier constituent flowing out through the passage 10. And, if it is desired to separate a heavier constituent such as dirt from a mixture (e. g. water and oil) deflectors 31, between which is an opening 32, are provided below the inlet compartment 3 and the passage 6 and below the passage 10 and the discharge compartment 8 as shown in Fig. 1. Turbulence or nonstreamline flow that would disturb the quiescence of liquid in compartment 2 is prevented as by dividing the flowing stream into a plurality of streams of small cross sectional area. To this end there are placed in compartment 2 a plurality of partitions 22 that may be merely vertical plates as shown in Figs. 1 and 2 or the plates may be provided with corrugations as shown at 22' in Fig. 4, the plates being so arranged as to produce, in effect a plurality of tubular passages and the corrugations being so formed that they will not interfere with the desired separation of the mixture.

The passages 6 and 10 extend the full width of the tank 1 but are not of great height with the result that the stream of mixture is relatively thin and the lighter constituent needs only to rise across the thickness of the stream in order to pass into an area of quiescence in which the separation by the force of gravity continues while a heavy substance needs only to sink through that thin stream into an area of quiescence in which the separation by force of gravity continues. If a mixture is separated into two constituents the heavier constituent will flow out of the passage 10 and the lighter constituent will be withdrawn from the upper surface of the quiescent body between the partitions 5 and 9. If a heavy constituent such as dirt is to be separated it will sink from the stream through opening 33 and be withdrawn through a drain cock 32.

The withdrawal of separated constituents may be manually or mechanically effected but in accordance with my invention they are automatically withdrawn in the proportions in which they collect in the separator. To this end the partition 4 extends across the top of the separating compartment 2 and extends to a point close to the partition 9 and from the partition 4 a vertical partition 14 extends upwardly close to the partition 9 and forms therewith a discharge passage 15 from which the flow of a lighter constituent is controlled by the weir 16 formed at the upper edge of the partition 14. An angular partition 17 forms an outlet compartment 18' with which the outlet pipe 18 communicates. The partition 17 extends close to the partition 9 and forms therewith a narrow but long discharge passage 8' from which the flow of a constituent is controlled by the weir 19 at the top of the partition 17.

The column of liquid, (e. g. water) between the level of the weir 19 and the bottom of the partition 9 will balance the column of liquid (e. g. water and oil) between the lower edge of the partition 9 and the level of the weir 16. The upper end of the pipe 7 will ordinarily be at the same level as the weir 16. The constituent discharging over the weir 16 or out of the pipe 7 may be collected in any way as by being collected in the compartment 13. If desired a substance collected in the compartment 13 may be heated as by steam coils 72; and such steam coils will heat the partition 4 and assist the flow of a viscous substance along that partition to the narrow though long discharge passage 15. If any further separation takes place in the compartment 13 the heavier constituent may be withdrawn through the pipe 21 and a lighter constituent through the pipe 20 or the compartment may be drained through the pipe 21. A vent pipe 33 equalizes the pressure acting upon the balanced columns of liquid.

From the foregoing it will be apparent that I have provided a method and apparatus whereby a quiescent body of liquid is maintained to permit gravity separation and wherein a fresh supply of mixture is continually flowed across that body in such a way that a light constituent may rise into a quiescent area while a heavy constituent sinks from the flowing stream, a constituent of intermediate specific gravity being withdrawn at about the same level or stratum at which fresh material is introduced. It will further be apparent that turbulence due to rapid flow will be minimized and that withdrawal of separated constituents is caused to occur automatically in the proportion in which the constituents collect in the separator. It will further be apparent that by bringing into close relation the weirs that control the discharge of the separated constituents and by providing narrow passages leading to those weirs and by providing weirs of unusual length, interference with the operation of my method and apparatus by motion like that of a ship, will be prevented. In this connection it is desirable that the levels of the weirs 16 and 19 be so adjusted that the line of division between the lighter and heavier constituents shall be within the discharge passage 15. In this way the surfaces at which the lighter and heavier constituents contact will remain small and motion of the ship will not interfere with separation or re-mix separated constituents.

A highly useful application of my invention resides in its application to the separation of oil from water on shipboard and it may be employed as the gravity separator of the invention described in my copending application Serial No. 710,390, filed May 1st, 1924. Another application of my present invention resides in its use in conjunction with the invention described in my copending application Serial No. 3,928, filed January 22nd, 1925, since the aeration or gasification described in that application may interfere with the maintenance of a quiescent separating body of the mixture unless that body be divided into a plurality of streams of relatively small cross-section as herein described.

While I have described in great detail one form of apparatus embodying and whereby my invention may be practiced I do not intend that my invention shall be limited thereto but that it shall include such modifications and variations as fall within the hereunto appended claims. In this connection I would point out that it is not necessary to the operation of my invention that the weirs 16 and 19 be close together unless the effect of the motion of a ship is to be avoided; and it is with the object of avoiding deep crests of substances discharging over the weirs 16 and 19 that those weirs are elongated. In the absence of motion of the separating tank it is only necessary that the discharge from the compartments 2 and 8 be controlled by weirs at respectively proper levels in case automatic or hydrostatic control from those compartments is desired. If small pipes or other passages are used to discharge substances from the compartments 2 and 8 a dynamic force may be produced by the flow of liquid that will increase the head acting to maintain hydrostatic balance. The continuous separation of immiscible substances by gravity is an important feature of my invention; and the prevention of turbulence, even when large quantities of mixture are being rapidly handled, as by division of the stream of mixture or a constituent thereof (e. g. water) into streams of relatively small cross-section without interference with the separating action of gravity, is very effective in such continuous gravity separation.

What I claim as new and desire to secure by Letters Patent of the United States is:

1. In a separating device for immiscible substances, a compartment for maintaining a body of the mixture in substantial quiescence, and having an outlet at one level for one substance, means for causing mixture to flow into said compartment at substantially the same level in a stream directed toward said first named outlet, an outlet for withdrawing another substance from a different level of said compartment and means for hydrostatically controlling said withdrawal of said substances through their respective outlets.

2. In a separating device for immiscible substances, a compartment for maintaining a body of the mixture in substantial quiescence, and having an outlet at one level for one substance, means for causing mixture to flow into said compartment at substantially the same level in a stream directed toward said outlet, an outlet for withdrawing another substance at another level, and adjacent weirs controlling said outlets.

3. In a separating device for immiscible substances, a compartment for maintaining a body of the mixture in substantial quiescence, an inlet for introducing mixture to said body in a substantially lateral direction at one level, an outlet for withdrawing one substance at substantially the same level, an outlet for withdrawing another substance at another level, and means for hydrostatically controlling said withdrawal of said substances through their respective outlets.

4. In a separating device for immiscible substances, a compartment for maintaining a body of the mixture in substantial quiescence, and having an outlet for one substance at one level of said compartment, means for causing mixture to flow into said compartment toward and at a point remote from said first named outlet and at substantially the same level as the level of said first named outlet, an outlet for withdrawing another substance at another level, and adjacent weirs for controlling discharge from said outlets.

5. In a separating device for immiscible substances, a compartment for maintaining a body of the mixture in substantial quiescence, an inlet for introducing mixture to said body at a lower level in a substantially horizontal direction, a restricted passageway for withdrawing one substance from said body at substantially the same level, an adjacent restricted passageway for withdrawing another substance from said body at a higher level, and adjacent weirs controlling discharge from said passageways and positioned at such level above said lower level as to maintain with said compartment a substantial depth of mixture above said lower level.

6. In a separating device for immiscible substances, a compartment for maintaining a body of the mixture in substantial quiescence, an inlet for introducing mixture to said body at one level, an outlet for withdrawing one substance at substantially the same level, a restricted passageway extending upwardly for withdrawing another substance at another level, and automatically operating means for so controlling discharge from said outlet and said passageway as to maintain the line of division of said substances within said passageway.

7. In a separating device for immiscible substances, a compartment for maintaining a body of the mixture in substantial quiescence, an inlet for introducing mixture to said body at one level, an outlet for withdrawing one substance at substantially the same level, a restricted passageway extending upwardly for withdrawing another substance at another level, and weirs controlling discharges from said outlet and said passageway and relatively positioned to maintain the line of division of said substances within said passageway.

8. In a separating device for immiscible substances, a compartment for maintaining a body of the mixture in substantial quiescence, an inlet compartment communicating at one level with said first named compartment, an outlet for one substance at substantially the same level, an outlet for another substance at another level, weirs at different relative levels controlling respectively said outlets, and a passageway leading from said inlet compartment at a level between said two first named levels and discharging at the level of the weir controlling said second named outlet.

9. In a device for separating immiscible substances, a compartment for maintaining a body of the mixture, means for maintaining a flow of mixture across said body in a substantially straight line at one level in a stream of which the depth is so limited as to constitute only a minor fraction of the depth of said body, an outlet for one substance at substantially the same level and having a height limited to the depth of said stream, an outlet for another substance at another level, and adjacent weirs controlling flow from said outlets.

10. A separating device for immiscible liquids, comprising a substantially closed tank, means for maintaining a flow of supplied liquid across the bottom thereof, a water discharge leading from the lower part of said tank, an oil discharge leading from the upper part of said tank, means for equalizing the gas pressure in said discharges, and adjacent weirs respectively controlling the flow of liquid from said discharges.

11. A separating device for immiscible liquids, comprising a substantially closed tank, an inlet for said tank and communicating with a lower point thereof, a water discharge leading from a lower point of said tank remote from said inlet point thereof, an oil outlet leading from a higher point of said tank, means for equalizing the gas pressure in said water discharge and said oil outlet, and adjacent weirs respectively controlling said water discharge and said oil outlet.

12. A device for separating immiscible liquids, comprising a tank, an inlet compartment and an outlet compartment therefor, said tank having substantially vertical openings adjacent the bottom thereof whereby said compartments communicate with said tank adjacent the bottom thereof at spaced points, a weir at one level controlling flow from said outlet compartment, and a weir adjacent said first named weir and at another level controlling flow from the body of said tank.

13. A device for separating immiscible liquids, comprising a tank, an inlet compartment and an outlet compartment therefor, said compartments communicating with said tank adjacent the bottom thereof at spaced points, a weir at one level controlling flow from said outlet compartment, an adjacent weir at another level controlling flow from the body of said tank, and a discharge outlet leading from said inlet compartment and discharging at substantially the level of one of said weirs.

14. In a separating device for immiscible substances, a compartment for maintaining a body of the mixture in substantial quiescence, an inlet for introducing mixture to said body at one level, an outlet for withdrawing one substance at substantially the same level, an outlet for withdrawing another substance at another level, means for hydrostatically controlling said withdrawal of said substances through their respective outlets, and an outlet from said compartment below said level for a heavy substance.

15. In a separating device for immiscible substances, a compartment, means for flowing mixture laterally into said compartment at one level thereof, means for laterally withdrawing one constituent of the mixture at substantially the same level, an outlet for another constituent at the top of said compartment, and an outlet for a heavy substance in the bottom of said compartment and extending transversely thereof intermediate said first named inlet and outlet.

16. In a separating device for immiscible substances, a compartment for maintaining a body of the mixture in substantial quiescence, an inlet for introducing mixture to said body at one level, an outlet for withdrawing one substance at substantially the same level, an outlet for withdrawing another substance at another level and means for dividing said compartment in the zone of said level into horizontal stream-line passages of relatively small cross-sectional area.

17. The process of separating immiscible substances from a mixture thereof which consists in maintaining a body of the mixture in substantial quiescence, introducing mixture thereto at one level with a substantially horizontal direction of flow, withdrawing one substance at substantially the same level and another substance at another level of said body spaced at such distance from said first named level as to maintain in said body a substantial depth of liquid between said levels, and hydrostatically controlling said withdrawal of each of said substances from said body.

18. The process of separating immiscible substances which consists in maintaining a body thereof relatively quiescent to permit stratification of said substances, feeding the substances in a substantially longitudinal direction to one stratum, withdrawing one substance from substantially the same stratum and another substance from its stratum, flowing said substances separately to and freely discharging said substances respectively at levels so related as to automatically effect unrestricted discharge of the substances in the proportions in which they are separated from each other.

19. The process of separating oil from water which consists in maintaining a body of mixture thereof in substantial quiescence, withdrawing water therefrom at a lower level thereof and withdrawing oil at the top of said body, while feeding mixture to said body at a lower level in a stream directed toward the point at which water is withdrawn therefrom, and hydrostatically controlling said withdrawal of oil and water from said body, the level at which oil is withdrawn from said body being spaced at such distance from the level at which water is withdrawn therefrom as to maintain a substantial depth of mixture between said levels.

20. In a gravity separator for mixtures of immiscible substances, a separating compartment having at one end a mixture inlet adjacent the bottom thereof, an outlet compartment communicating with said separating compartment at a point adjacent the bottom of the other end thereof, said compartments converging at their upper ends into adjacent upwardly extending relatively restricted passages, and adjacent weirs at different levels controlling flow from said passages.

21. In a gravity separator for mixtures of immiscible substances, a separating compartment having inlet and outlet passages adjacent the bottom thereof and respectively at opposite ends thereof, partitions dividing the cross section of said separating compartment into a plurality of stream-line passages extending in the direction of flow and being of relatively restricted cross-sectional area, and means for withdrawing a lighter constituent of the mixture from the upper part of said separating compartment.

22. The process of separating mixtures of immiscible substances which comprises maintaining a body of liquid in substantial quiescence, continuously flowing the mixture in a substantially straight line across a given level of said body, in a stream having a depth equal to only a minor fraction of the depth of said body of liquid, continuously withdrawing one constituent from said body at substantially the same level, continuously withdrawing another constituent of the mixture from said body at another level, and controlling the withdrawal of each of said constituents by hydrostatic balance between said constituents.

23. The process of separating mixtures of immiscible substances which comprises maintaining a body of liquid in substantial quiescence, continuously flowing the mixture across a given level of said body in narrow streams and thereby preventing turbulence of said body, continuously withdrawing one constituent of said mixture from said body at substantially the same level, and continuously withdrawing another constituent of said mixture from said body at another level thereof.

24. In a separating device for immiscible substances, a compartment, a downwardly extending inlet passage opening into one end of said compartment near the bottom thereof, an upwardly extending discharge passage leading from the other end of said compartment near the bottom thereof, a discharge passage for a lighter substance leading from the top of said compartment, and an outlet for a heavier substance and extending transversely of said compartment in the bottom thereof intermediate the ends thereof.

25. In a gravity separator for mixtures of immiscible substances, a separating compartment having at one end a mixture inlet adjacent the bottom thereof, an outlet compartment communicating with said separating compartment at a point adjacent the bottom of the other end thereof, said separating compartment converging at its upper end into an upwardly extending relatively restricted passage, and weirs adjacent one another and at different levels and respectively controlling flow from said restricted passage and said outlet compartment.

26. In a gravity separator for mixtures of immiscible substances, a separating compartment having inlet and outlet passages adjacent the bottom thereof and respectively at opposite ends thereof, partitions in said separating compartment and dividing the cross-section thereof into a plurality of upwardly opening stream-line passages extending in the direction of flow and of relatively restricted cross-sectional area, and means for withdrawing a lighter constituent of the mixture from the upper part of said separating compartment.

27. In a separating device for a mixture of immiscible substances, a tank having an outlet for one substance at an upper level of said tank, an inlet compartment and an outlet compartment, said compartments communicating with said tank in a substantially horizontal direction adjacent the bottom of said tank at spaced points thereof, and weirs at different levels for respectively controlling flow from said outlet compartment and from said outlet and the lower of said weirs being spaced at such level above the highest point at which either of said compartments communicates with said tank as to maintain a substantial depth of mixture in said tank above said point of communication.

28. In a separating device for immiscible substances, a tank having at spaced points an inlet for mixture to be separated and an outlet for one substance of the mixture, an upwardly extending partition in said tank forming a compartment into which said inlet leads, a second upwardly extending partition in said tank and forming a compartment from which said outlet leads, said partitions being formed to provide communicating openings near the bottom of said tank between said compartments and the space in said tank between said partitions, said tank being provided with an outlet for another substance from said space, and weirs at different levels controlling said outlets and the lower of said weirs being at such level above the level of the upper edge of said openings as to maintain a substantial depth of mixture in said tank between said partitions and above said edges.

29. In a separating device for mixtures of immiscible substances, a tank having a mixture inlet, a partition extending downwardly in said tank to a point adjacent the bottom thereof and forming with a wall of said tank spaced from said inlet a discharge passage of restricted cross-section, a second partition in said tank and upwardly directed and forming with the upper portion of said first partition a second discharge passage of restricted cross-section, the horizontal distance between the portions of said partitions which form said restricted passage being a minor fraction of the vertical dimension of said restricted passage, and weirs at different levels controlling discharge from said passages, the weir for the first named discharge passage being at a lower level than the weir for the second named discharge passage, and the weirs being at such relative levels as to maintain in the second of said passages the dividing line between the respective bodies of the immiscible substances formed as the result of the gravity separation of the mixture in the tank.

30. In a gravity separator for mixtures of immiscible substances, a separating compartment having adjacent the bottom thereof an inlet for mixture and an outlet for one substance and having an outlet for another substance spaced substantially above said first named outlet, and stratifying plates within said compartment between said inlet and said outlets and inclined to the horizontal and substantially parallel to a line from said inlet to said first named outlet.

31. In a gravity separator for mixtures of immiscible substances, a separating compartment having adjacent the bottom thereof an inlet for mixture and an outlet for one substance and having an outlet for another substance spaced substantially above said first named outlet, and stratifying plates within said tank between said inlet and said outlets and inclined to the horizontal and substantially parallel to a line from said inlet to said first named outlet, said plates being corrugated in a direction transverse to the line from said inlet to said first named outlet.

32. In a gravity separator for mixtures of immiscible liquids, a separating compartment having an inlet for the mixture and an outlet for a heavier one of said liquids and having an outlet for a lighter one of said liquids and positioned at a level substantially above the level of said first-mentioned outlet, and a plurality of partitions within said compartment between said inlet and said first-mentioned outlet and extending below said second-mentioned outlet and forming an angle with the horizontal and substantially parallel to a line from said inlet to said first-mentioned outlet and dividing liquid in said compartment into a plurality of layers of limited dimension normal to said partitions.

33. In a gravity separator for mixtures of immiscible liquids, a separating compartment having an inlet for the mixture and an outlet for a heavier one of said liquids and having an outlet for a lighter one of said liquids and positioned at a level substantially above the level of said first-mentioned outlet, a plurality of substantially parallel stratifying plates within said compartment between said inlet and said outlet and between the levels of said outlets and forming an angle with the horizontal and extending above said inlet and dividing liquid in said compartment into a plurality of layers of limited dimension normal to said plates, a weir for controlling flow from said first-named outlet, and a second weir at a level above said first-named weir for controlling flow from said second named outlet.

34. In the continuous gravity-separation of immiscible liquids of different specific gravity, the steps comprising flowing along a stream of a mixture of said liquids, expanding the transverse area of the flowing stream and thereby maintaining a body of the liquids, and withdrawing a heavier one of the liquids from said body at a point remote from that at which mixture enters said body, while dividing said body of liquids at a point between the point at which fresh mixture flows thereto and said point at which heavier liquid is withdrawn therefrom into a plurality of layers inclined to the horizontal and having relatively small transverse dimension, and withdrawing from said body at a point above the upper edges of said layers a lighter one of the liquids rising in said layers by difference of specific gravity.

35. In the continuous gravity-separation of immiscible liquids of different specific gravity, the steps comprising flowing along a stream of a mixture of said liquids, expanding the transverse area of the flowing stream and thereby maintaining a body of the liquids, and withdrawing a heavier one of the liquids from said body at a point remote from that at which mixture enters said body, while dividing said body of liquids at a point between the point at which fresh mixture flows thereto and said point at which heavier liquid is withdrawn therefrom into a plurality of streams of relatively small transverse dimension, and withdrawing from said body at a point above said streams and above said point at which a heavier liquid is withdrawn a lighter one of the liquids rising in said streams by difference of specific gravity.

36. In a separator for a mixture of immiscible substances of different specific gravity, a compartment having a mixture inlet and an outlet for a lighter substance and having an outlet for a heavier fraction of the mixture at a level below that of said first-mentioned outlet, a second compartment having an inlet adapted to receive said fraction and having an outlet for a heavier substance of the mixture, a plurality of substantially parallel and impervious partitions within said second compartment between said inlet and said outlet thereof and dividing the contents of said second compartment into a plurality of streams of limited transverse dimension, and means for withdrawing from an upper level of said second compartment lighter substance rising by difference of specific gravity between said plates.

37. In the separation of a mixture of immiscible liquids of different specific gravity the steps comprising flowing along a stream of the mixture, withdrawing from an upper level of the stream a lighter one of said liquids, expanding the transverse area of the residue of the stream and thereby maintaining a body of the liquids, withdrawing a heavier one of the liquids from said body, while dividing said body between the point at which said residue flows thereto and the point at which said heavier liquid is withdrawn therefrom into a plurality of streams of relatively small transverse dimension, and withdrawing said lighter liquid rising in said streams by difference of specific gravity from said body at a point above said point at which said heavier liquid is withdrawn from said body.

In testimony whereof, I have signed my name to this specification.

LEO D. JONES.

CERTIFICATE OF CORRECTION.

Patent No. 1,864,511.  June 21, 1932.

LEO D. JONES.

It is hereby certified that error appears in the printed specification of the above numbered patent requiring correction as follows: Page 4, line 62, claim 7, for the word "discharges" read discharge; page 5, line 4, claim 18, for "longitudinal" read horizontal; and that the said Letters Patent should be read with these corrections therein that the same may conform to the record of the case in the Patent Office.

Signed and sealed this 11th day of October, A. D. 1932.

(Seal)

M. J. Moore,
Acting Commissioner of Patents.